3,167,457
METHOD OF FORMING A NICKEL FUEL CELL ELECTRODE
Francis Thomas Bacon, Little Shelford, England, and Paul William Jones, Glens Falls, N.Y., assignors to National Research Development Corporation
No Drawing. Filed Feb. 21, 1962, Ser. No. 174,715
Claims priority, application Great Britain, Feb. 28, 1961, 7,315/61
7 Claims. (Cl. 136—120)

Porous nickel electrodes for use in fuel cells, particularly oxygen electrodes for use in cells of the hydrogen/oxygen type operating at medium temperatures, require to be formed with a protective layer of oxide before being put into service. In order to keep the electrical resistance of such an oxide layer low, it preferably has lithium incorporated in it as described in U.S. Patent No. 2,716,670. For this purpose the electrode is first impregnated with a solution of a lithium salt, is then dried and then subjected to an oxidising treatment. Such oxidation is normally carried out at a temperature in the region of 700 to 800° C. in air after which the electrode is regarded as ready for operation.

According to the present invention, after an initial impregnation with a solution of a lithium salt followed by an oxidising treatment, the electrode is impregnated with a solution containing both a lithium salt and a nickel salt which leads to the production of nickel oxide on heating and is then subjected to a further heat treatment to produce additional nickel oxide. In other words, the production of oxide is carried out in two stages, during the second of which the nickel salt used for impregnation is converted to the oxide. This second stage of oxide production is found to lead to an increased catalytic activity of the electrode which permits a fuel cell to give a higher current for a given voltage or conversely a higher voltage for a given current than would otherwise be the case. This increased catalytic activity is thought to result from the increase of internal surface area arising from the additional oxide which is produced in finely divided form as a result of the second heat treatment.

The second heat treatment is preferably carried out at a lower temperature than the initial oxidation, i.e. within the range of 300 to 500° C. and this lower temperature is found to increase the activity of the oxide thus produced. Towards the lower end of the range, there is a tendency towards loss of strength in the oxide produced. To avoid this, while at the same time obtaining the benefits of the reduced temperature, the middle part of the range, i.e. between 350 to 450° C. is found to be advantageous. The effect of a reduced temperature on the production of oxide applies also to the initial oxidation treatment. This is therefore preferably carried out within the range of 500 to 700° C., i.e. at a somewhat lower temperature than that previously thought necessary. Optimum results are found to be obtained if the initial oxidation treatment is carried out at approximately 600° C. while the further heat treatment is carried out at approximately 400° C.

In order to describe the formation of the protective oxide in relation to the production of the electrode as a whole, a description will now be given of the successive steps necessary to produce one example of a finished electrode. The electrode itself comprises basically two layers of nickel of differing porosities so that in use the gas may force the electrolyte out of the larger pores while being prevented from bubbling into the body of the electrolyte by the capillary forces in the smaller pores.

*Example*

The coarse pore layer of the electrode was made from a mixture comprising 80 percent by weight of so-called "D" nickel powder (average particle size 7–9 microns) and 20 percent by weight of 100–240 mesh ammonium hydrogen carbonate powder. A layer of this mixture was pressed at 250 lbs. per square inch in a rubber press and sintered in a reducing atmosphere for half-an-hour at 1000° C.

To the layer thus produced was added a fine pore layer comprising "A" nickel powder (average particle size 3–4 microns) suspended in an aqueous solution of methyl cellulose. Some of this suspension was first rubbed into the coarse pore layer and then more was sprayed on. The assembly was then dried and sintered again in a reducing atmosphere for half-an-hour at 950° C. Further fine pore material was then applied as just described so as to seal any leaks which might remain in the original layer and the assembly was again sintered for half-an-hour at 950° C. in a reducing atmosphere. This completed the main structure of the electrode and it was then necessary to provide the active surface with protective oxide.

For this purpose the electrode was vacuum impregnated with a solution containing 200 gms. per litre of lithium nitrate and 1000 gms. per litre of nickel nitrate, after which it was dried and then oxidised in air for one hour at 600° C. After cooling, the electrode was fitted in a hydrogen/oxygen fuel cell in conjunction with a standard hydrogen electrode. Although not completely finished, the electrode was tested at this stage for purposes of comparison and the cell was found to give 7.75 amperes at 0.9 volt and 15.25 amperes at 0.8 volt.

After this test, the treatment of the electrode was completed. For this purpose it was first dried again and then re-impregnated with a half-strength solution, i.e. containing 100 gms. per litre of lithium nitrate and 500 gms. per litre of nickel nitrate. It was then dried and heated in air for half-an-hour at 400° C. This second heat treatment at a reduced temperature provided the additional finely divided active oxide referred to above.

The electrode thus produced was ready for normal operation and was again fitted in the cell in conjunction with a standard hydrogen electrode. Under these conditions the cell gave 8.75 amperes at 0.9 volt (an increase of 13 percent over the previous test) and 18.0 amperes at 0.8 volt (an increase of 18 percent over the previous test). In each of the tests the cell was operated at a temperature of 200° C. and 600 lbs. per square inch.

The condition of the electrode after the initial oxidation treatment was approximately the equivalent of that of an electrode produced by a normal method such as that described in U.S. Patent No. 2,716,670. The additional heat treatment in accordance with the invention, therefore, led to an improvement in performance which varied with the current density but nevertheless showed a significant improvement. It will be understood that improvements of this order are most important since they may decide whether or not the overall efficiency of a fuel cell is sufficient for commercial operation.

We claim:

1. A method of forming porous nickel electrodes for use in fuel cells of the hydrogen-oxygen type which comprises:
   (a) impregnating an active surface of a nickel electrode with a solution of a lithium salt,
   (b) subjecting said electrode to an oxidizing treatment,
   (c) thereafter impregnating said electrode surface with a solution comprising a lithium salt and a nickel salt which will produce nickel oxide on heating in air, and
   (d) heating the electrode to an elevated temperature sufficient to produce nickel oxide from nickel salt impregnated in the electrode.

2. A method of forming porous nickel electrodes for use in fuel cells of the hydrogen-oxygen type which comprises:
(a) impregnating an active surface of a nickel electrode with a solution of a lithium salt,
(b) drying the solution impregnated electrode,
(c) heating the dried impregnated electrode in air at about 500 to 700° C.,
(d) cooling the resulting oxidized electrode,
(e) impregnating the cooled electrode with a solution comprising a lithium salt and a nickel salt which will produce a nickel oxide on heating in air, and
(f) heating the nickel salt impregnated electrode in air at about 300 to 500° C. until nickel salt impregnated in the electrode is converted to nickel oxide.

3. A method as claimed in claim 2 wherein said heating of step (d) is carried out at a temperature between about 300 to 500° C.

4. A method as claimed in claim 2 wherein said heating of step (d) is carried out at a temperature between about 350 to 450° C.

5. A method as claimed in claim 2 wherein said oxidizing treatment of step (b) comprises heating the electrode in air at a temperature between about 500 to 700° C. for about one hour.

6. A method as claimed in claim 2 wherein said lithium salt is lithium nitrate and said nickel salt is nickel nitrate.

7. A method of forming porous nickel electrodes for use in fuel cells of the hydrogen-oxygen type which comprises:
(a) providing an electrode having a porous surface formed of sintered nickel powder,
(b) impregnating the porous surface of said electrode with a solution consisting essentially of lithium nitrate and nickel nitrate dissolved in water,
(c) drying the solution impregnated electrode,
(d) cooling the dried electrode,
(e) oxidizing the impregnated electrode surface by heating the electrode in air for about one hour at about 500 to 700° C.,
(f) cooling the resulting oxidized electrode,
(g) impregnating the cooled electrode with a solution consisting essentially of lithium nitrate and nickel nitrate containing about one-half the salt concentration of the solution of step (b),
(h) drying the impregnated electrode, and
(i) oxidizing the dried electrode by heating in air at about 350 to 450° C. for about one-half hour to produce an electrode of improved activity as compared to an electrode not subjected to steps (g) through (i).

References Cited by the Examiner
UNITED STATES PATENTS

| | | | |
|---|---|---|---|
| 2,716,670 | 8/55 | Bacon | 136—120 |
| 3,041,388 | 6/62 | Fukuda et al. | 136—28 |

FOREIGN PATENTS

| | | |
|---|---|---|
| 1,259,322 | 3/61 | France. |

JOHN H. MACK, *Primary Examiner.*
JOHN R. SPECK, *Examiner.*